US011219233B2

(12) United States Patent
Jimenez Angulo et al.

(10) Patent No.: US 11,219,233 B2
(45) Date of Patent: Jan. 11, 2022

(54) CULINARY PROCESSES AND PRODUCTS

(71) Applicant: McCormick & Company, Incorporated, Hunt Valley, MD (US)

(72) Inventors: Yurely Jimenez Angulo, Buderim (AU); Andrew Jesse Cartwright, Mount Coolum (AU); Debra Joy Adele Clement, Caboolture (AU)

(73) Assignee: MCCORMICK & COMPANY, INCORPORATED, Hunt Valley, MD (US)

( * ) Notice: Subject to any disclaimer, the term of this patent is extended or adjusted under 35 U.S.C. 154(b) by 62 days.

(21) Appl. No.: 16/614,250

(22) PCT Filed: May 17, 2018

(86) PCT No.: PCT/US2018/033168
§ 371 (c)(1),
(2) Date: Nov. 15, 2019

(87) PCT Pub. No.: WO2018/213566
PCT Pub. Date: Nov. 22, 2018

(65) Prior Publication Data
US 2020/0093164 A1 Mar. 26, 2020

Related U.S. Application Data

(60) Provisional application No. 62/508,006, filed on May 18, 2017.

(51) Int. Cl.
*A23L 27/12* (2016.01)
*A23L 27/00* (2016.01)
*A23D 7/005* (2006.01)

(52) U.S. Cl.
CPC .............. *A23L 27/12* (2016.08); *A23D 7/005* (2013.01); *A23L 27/80* (2016.08)

(58) Field of Classification Search
CPC .......... A23L 27/12; A23L 27/80; A23D 7/005
USPC ......................................... 426/534
See application file for complete search history.

(56) References Cited

U.S. PATENT DOCUMENTS

| | | |
|---|---|---|
| 3,615,702 A | 10/1971 | Swisher |
| 4,283,429 A | 8/1981 | Todd, Jr. et al. |
| 2005/0048181 A1 | 3/2005 | Gelin |
| 2012/0164276 A1* | 6/2012 | Frye ..................... A23L 29/244 426/61 |
| 2013/0287909 A1 | 10/2013 | Lewis et al. |

OTHER PUBLICATIONS

Degner et al., Factors Influencing the Freeze-Thaw Stability of Emulsion-Based Foods. (Year: 2014).*
Official Communication issued in International Bureau of WIPO Patent Application No. PCT/US2018/033168, dated Jul. 27, 2018.
IPRP for PCT/US2018/033168 dated Nov. 19, 2019.

* cited by examiner

*Primary Examiner* — Brent T O'Hern
(74) *Attorney, Agent, or Firm* — Greenblum & Bernstein, P.L.C.

(57) ABSTRACT

A method of making a food flavoring product is described including adding a plant material to a water-oil carrier, forming a homogenous mixture of said plant material and water-oil carrier, placing the homogeneous mixture into a package, and subjecting the package to freeze-thaw cycling to separate the water and oil carriers containing said plant material into separate components. This results in a composition separated into individual water and oil components with enhanced color and flavor characteristics when dispensed from the package.

18 Claims, No Drawings

CULINARY PROCESSES AND PRODUCTS

CROSS-REFERENCE TO RELATED APPLICATIONS

The present application claims priority to U.S. Provisional Application Ser. No. 62/508,006, filed May 18, 2017, the disclosure of which is expressly incorporated by reference herein in its entirety. The present application also contains information which is related to commonly assigned U.S. patent application Ser. No. 13/880,512 filed Jul. 9, 2013, entitled Method of Preserving Plant Material, the disclosure of which is also expressly incorporated by reference herein in its entirety.

TECHNICAL FIELD

The field of art to which this invention generally pertains is culinary flavoring agents, and specifically plant material containing food flavoring drizzles.

BACKGROUND

Herb flavoring products are commonly used by restaurants as high quality fresh sauces to flavor meals and dress plates. A particular style of product is made from fresh herbs or spices, blended with olive oil and seasoned. It is typically drizzled over the meat in a zig-zag pattern and/or circled around the edge of the dish. If made fresh in a restaurant it would typically have a 2-3 day shelf life before it discolors, develops off flavors and is no longer acceptable. What differentiates this type of herb flavoring product from a regular sauce is the suspension of the herb components within a high-clarity oil phase. The product starts out as a homogenous mixture which is drizzled through a defined nozzle, and after pouring, the oil spreads slightly, separating slightly from the herb/spice particulates. This ability to mix the components in a homogeneous blend prior to the separation step helps contribute to the consistent, reproducible quality of the product. This controlled volume, high clarity oil separation is a critical defining feature of a restaurant quality flavoring product, but is extremely difficult to achieve in a large scale commercial food manufacturing environment, due to the difficulty in combining oil and water based components without inducing a cloudy/milky emulsion, among other things.

Another aspect that has not to date yet been achieved on a commercial retail scale is the ability to retain the fresh, vibrant colors and flavors of the herbs, spices or edible plant materials within this type of product with a retail-suitable shelf life. For example, most retail environments would require a shelf life of at least 7 days from manufacture, and more preferable, at least 30 days or more from date of manufacture. Traditional food preservation processes for liquid food products involve heat treatment and/or acidification to achieve food safety but these treatments destroy the colors and flavors, leading to a product which no longer looks or tastes fresh. For example, the chlorophyll in green leafy plants is degraded, volatile essential oils are evaporated, and other fresh flavor notes are lost when heated, and acidification induces changes such as chlorophyll breakdown. Over the years many novel food processes have been investigated, some of which have provided modest improvements in color and flavor retention by replacing heat with pressure, or using other combinations of processing. However, commercialized sauces and flavoring products have until now, still been a long way from their restaurant counterparts, e.g., in terms of quality delivery.

The embodiments described herein address these challenges.

BRIEF SUMMARY

A method of making a food flavoring product is described including adding a plant material to a water-oil carrier, forming a homogenous mixture of said plant material and water-oil carrier, placing the homogeneous mixture into a package, and subjecting the package to freeze-thaw cycling to separate the water and oil carrier containing said plant material into separate water and oil containing components, resulting in a composition comprising a separate water phase containing said plant material with enhanced characterizing pigment color of the plant material and enhanced flavor characteristics, and a plant material colored oil phase when dispensed from the package.

Additional embodiments include: the method described above where the plant material contains browning enzymes and is pre-treated to deactivate substantially all of the browning enzymes; the method described above where the plant material is treated by electromagnetic energy with wavelengths greater than 1 μm prior to addition to the water-oil carrier; the method described above where the plant material is treated by microwave energy prior to addition to the water-oil carrier; the method described above where the plant material has a moisture content of less than 70% prior to addition to the water-oil carrier; the method described above where the plant material comprises apple, asparagus, aubergine, basil, bay leaf, beetroot, capsicum, berry fruits, carrot, coriander, shallots, chili, chili pepper, chives, chervil, dill, fennel, garlic, ginger, galangal, kale, leek, lemon, lemongrass, lime, melon, mint, marjoram, olive, onion, oregano, parsley, pear, pepper, rosemary, radish, sage, spring onion, spinach, stone fruits, sweet potato, thyme, tarragon, turmeric, watercress, and/or mixtures thereof; the method described above where the herb and/or spice is present in the composition in an amount of at least 2% by weight; the method described above where the oil comprises any vegetable oil or edible culinary oil, such as, for example, canola oil, coconut oil, olive oil, peanut oil, rapeseed oil, rice bran oil, safflower oil, sesame oil, soybean oil, sunflower oil, and/or mixtures thereof; the method described above where oil is present in an amount of 20 to 70% by weight; the method described above where the characterizing pigment color of the plant material is present in both the oil and water phase; the method described above where the freeze-thaw cycling comprises freezing the composition at a temperature below 0° C. and thawing the frozen composition at a temperature above 0° C. for at least one freeze-thaw cycle; the method described above where the homogenous mixture additionally contains starch, gums, thickeners, stabilizers, emulsifiers and/or hydrocolloids, antioxidants, salts, sugars and/or preserving agents. The product made according to the above-process is also described.

A food flavoring product is also described including discrete particulates of plant material in a carrier having an oil phase and a water phase, where the characteristic flavor and color of the plant material when fresh is retained in the particulates and transferred into the oil phase and water phase and where the characteristic colors and flavors of the plant material within the particulates, the water phase and the oil phase are retained in the product.

Additional embodiments include: the product described above where the characteristic colors and flavors of the plant material within the particulates, the water phase and the oil phase are retained in the product when stored in refrigerated conditions for at least 7 days; the product described above where the characteristic colors and flavors of the plant material within the particulates, the water phase and the oil phase are retained in the product when stored in refrigerated conditions for at least 30 days; the product of described above where the product is a homogenous blend; the product described above where the oil phase and water phase are separated, and the oil phase is substantially clear; the product described above where the oil phase and water phase are separated by freeze-thaw cycling; the product described above where the freeze-thaw cycling comprises freezing the product to a temperature below 0° C. and thawing the product at a temperature above 0° C. for at least one freeze-thaw cycle; the product described above where the characteristic color of the plant material within the oil phase appears florescent, bright and highly pigmented; the product described above where the plant material contains enzymes which have been substantially deactivated; the product described above where the plant material contains plant pigments which remain oil soluble even after enzyme deactivation; the product described above where the plant material has been treated with electromagnetic energy with wavelengths greater than 1 µm prior to combination with the carrier; the product described above where the plant material has been treated with microwave energy prior to addition to the carrier; the product described above where the plant material has a moisture content of less than 70% prior to addition to the carrier; the product described above where the plant material comprises an aromatic plant material; the product described above where the plant material comprises apple, asparagus, aubergine, basil, bay leaf, beetroot, capsicum, berry, fruits, carrot, coriander, shallots, chili, chili pepper, chives, chervil, dill, fennel, garlic, ginger, galangal, kale, leek, lemon, lemongrass, lime, melon, mint, marjoram, olive, onion, oregano, parsley, pear, pepper, rosemary, radish, sage, spring onion, spinach, stone fruits, sweet potato, thyme, tarragon, turmeric, watercress, and/or mixtures thereof; the product described above where the plant material is present in the product in an amount of at least 2% by weight; the product described above where the oil in the oil phase comprises any vegetable oil or edible culinary oil, such as, for example, canola oil, coconut oil, olive oil, peanut oil, rapeseed oil, rice bran oil, safflower oil, sesame oil, soybean oil, sunflower oil, and/or mixtures thereof; the product described above which additionally containing flavoring agents; the product described above where the oil in the product is present in an amount of 20% to 70% by weight; the product described above where the product additionally contains starch, gums, thickeners, stabilizers, emulsifiers and/or hydrocolloids; the product described above where the product additionally contains antioxidants, salts, sugars and/or preserving agents; the product described above where the product does not support microbial growth at refrigerated conditions; the product described above where the product is modified using water activity and/or pH modifying agents; the product described above where the product can be poured from a package; the product described above where the characteristic colors and flavors of the plant material within the particulates, the water phase, and the oil phase, are retained; the product described above where the characteristic pigment and flavor of the plant material is retained in both the water and oil phases when stored in refrigerated conditions for at least 7 days; and the product described above where the characteristic pigment and flavor of the plant material is retained in both the water and oil phases when stored in refrigerated conditions for at least 30 days.

These and additional embodiments are further described below.

DETAILED DESCRIPTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

The ability to achieve both high clarity oil separation, combined with vibrant fresh colors and flavors of the plant material within in a retail-ready product format is key to the embodiments described herein. The product described herein delivers the vibrant fresh colors and flavors of freshly made, restaurant quality products made from herbs, spices and other plant material, in a format which can be manufactured, packaged, stored, shipped, merchandised and sold in both retail and industrial environments, while delivering the critical visual separation (bleed) between oil and herbs when dispensed. The plant material within the product exhibits the characteristic color and flavor of the fresh plant material from which it was derived. Both the water phase and the oil phase exhibit characterizing plant pigments.

There are two key problems with retail-ready products and sauces that are addressed by the products and processes described herein. The first is the ability to produce a product on a large commercial scale which contains oil and water phases which are designed to separate. Traditionally manufacturers seek to attain homogenous liquid products, as this is critical to adequately pump, mix, transport, and dose products during manufacture and packing operations. Of particular significance are mixtures containing a combination of water and oil phases, and in particular where additional particulates are present. Product developers and food technologists use specialized equipment to combine the oil and water phases into an emulsion by blending the two phases. They then seek specialty starches, emulsifiers and hydrocolloids to thicken and/or stabilize the emulsion to suspend any particulates and to prevent the two phases separating. The ratio of oil to water phases, the quantity and type of particulates, as well as the stabilizing system chosen will influence the emulsion formation, stability, and finished product attributes. When the liquid containing both oil and water components is combined into a homogenous and stable blend this results in a cloudy/milky colored emulsion (e.g., like mayonnaise). Thus, the product is no longer aesthetically authentic nor matches the desired restaurant quality product benchmark. Alternatively, if the product requires distinct water and oil phases to exist in the final product (e.g., certain dressings where the oil floats on top of the vinegar) then a dual filling mechanism will typically be used at the time of packing. The limitation of this is that the dressing would always exist as two distinct layers with a distinct interface between the two layers. There would be limited contribution of the water miscible suspended particles into the oil phase (for example the flavors and colors of the suspended plant components would remain in the water phase and would not readily transfer into the oil phase).

By enabling this product to be manufactured as a homogenous mix, which is then split after packing, this process allows for color and flavor transfer of the plant material throughout the entire product. It also allows the desired consumer experience to be achieved without the need for dual filling, or post-packaging mixing/combining solutions.

The second problem encountered during commercial manufacture of such products and sauces is maintaining the natural color and flavor of the plant materials from which they are made. For years, attempts have been made to create restaurant quality products using traditional methods for large scale manufacture of sauces, but these typically involve heat treatment and/or acidification to meet food safety requirements. Heat treatments such as pasteurization or heat sterilization, and acidification with food acids, can degrade the colors and flavors of plant materials. Alternative technologies such as high pressure processing claim to allow for better preservation of the colors and flavors of fresh ingredients. However, the low viscosity of the products provides inadequate preservation of the plant material leading to premature deterioration. These technologies also rely on emulsion stability, thus benchmark texture and high clarity oil separation could not be attained using existing technology.

New technology in the form of plant material treated in accordance with U.S. patent application Ser. No. 13/880,512, referenced above, provide an instrument to achieve fresh colors and flavor within a liquid medium. The prior processing of the plant material imparts certain properties into the plant material which protect it during subsequent transition into a flavoring product. For example, the process deactivates browning enzymes, while maintaining the characteristic pigments of the fresh plant material. This, along with other changes described herein provide color and flavor impacts that are not seen when using other types of plant material.

The affinity of plant material for a water based medium, in contrast to the characterizing feature of the products being a high clarity oil, means that it is necessary to design a way of preparing, transporting and dosing the product in a homogenous, emulsified form, but which can separate into individual water and oil components during the dispensing of the product by the end user. This separation is achieved through a strategically positioned freeze-thaw cycle which occurs after packing of the product in the final package, but prior to use by the end-user. Typically this would occur as part of the manufacture process, by placing the finished product into the freezer (below 0° C./32° F.) immediately after packaging, holding for sufficient time for the temperature to drop to the point where the water components change state (typically 1, 2, 3 or 4 days), then thawing the product by allowing it to equilibrate at a temperature above 0° C./32° F. before dispatching to the end user. Suitable packaging would include, but is not limited to, a bottle, can, tube, sachet, pouch or other packaging type that allows the product to be frozen, thawed, and shaken to combine, and then dispensed in a way that the product can be drizzled over a meal. Typically a flexible or semi-rigid type of packaging would work best. A stabilizing system will be selected to stabilize the emulsion during manufacture, storage, transport and packing, but upon freezing and thawing the emulsion splits to release the high clarity oil, i.e. maximizes the separation.

The stabilizing system can be selected from conventional emulsifiers, stabilizers, starches, gums and hydrocolloids typically used in the food industry in conventional amounts, and will depend on the equipment used to form the emulsion, the oil to water ratio of the emulsion, as well as and the plant material and other ingredients required to be stabilized during and following manufacture. Typically a combination of two or more stabilizers can be used to achieve the desired result. Examples of emulsifiers include lecithin, mono- and diglycerides of fatty acids, acetic and fatty acid esters of glycerol, lactic and fatty acid esters of glycerol, polyglycerol esters of fatty acids, ammonium polyphosphate, calcium polyphosphate, dicalcium diphosphate, disodium diphosphate, disodium orthophosphate; gelatin, potassium polyphosphates, sodium polyphosphate, stearyl citrate sucroglycerides, sucrose acetate isobutyrate, sucrose esters of fatty acids, tetrapotassium diphosphate, sodium lauryl sulphate, emulsifying salts, palmitates, stearates, pectin, oleates, tartrates and polysorbates. Examples of hydrocolloids include xanthan gum, guar gum, gum Arabic, gellan gum, carrageenan, carob been gum, tragacanth gum and cellulose gum. Other suitable stabilizers include sucrose ester, proplylene glycol alginate, ethyl hydroxyethyl cellulose, methyl cellulose, methyl ethyl cellulose, hydroxypropylmethylcellulose, microcrystalline cellulose, modified starches, and pectin. The stabilizer is typically added at a quantity of 0.001% to 3.0% by weight depending on the type of stabilizer, the oil to water ratio and the type of solids within the recipe. The use of this freeze/thaw step enables the separation potential to be standardized across products and batches. Typically one freeze/thaw cycle is sufficient, however, multiple freeze/thaw cycles can be used.

In addition, conventional antioxidants, salts, sugars and/or preserving agents typically used in the food industry in conventional amounts can also be added to the product composition. The product can also be modified using water activity and pH modifying agents to help prevent microbial growth under refrigerated conditions, i.e., where pathogenic microorganisms do not grow in the product. For example, a water activity less than 0.85 can be sufficient to prevent microbial growth in some products at refrigerated conditions. Refrigerated conditions are typically regulated at less than 4° C., chilled conditions typically up to less than 10° C.

Separation of the oil and water phases is normally seen as an industrial problem, and therefore most commercial product development focuses on emulsion stability and preventing separation. The process described herein provides an unexpected advantage whereby the separation of the water and oil phases, caused by freeze-thaw cycles, is used as a benefit to create a product, capable of large scale production, with retail-capable shelf stability of typically several months or more. A wide range of edible oils can be selected to impart the desired flavor and functional characteristics to the product. For example, any vegetable oil or edible culinary oil, such as, for example, canola oil, coconut oil, olive oil, peanut oil, rapeseed oil, rice bran oil, safflower oil, sesame oil, soybean oil, sunflower oil, and/or mixtures thereof.

The invention lends itself to products made from a variety of culinary plant materials, including vegetables, fruits, herbs and spices. Some exemplary plant materials include apple, asparagus, aubergine, basil, bay leaf, beetroot, capsicum, berry fruits, carrot, coriander, shallots, chili, chili pepper, chives, chervil, dill, fennel, garlic, ginger, galangal, kale, leek, lemon, lemongrass, lime, melon, mint, marjoram, olive, onion, oregano, parsley, pear, pepper, rosemary, radish, sage, spring onion, spinach, stone fruits, sweet potato, thyme, tarragon, turmeric, watercress, and/or mixtures thereof.

One of the advantages of utilizing the culinary plant material treated by the process described above, is the vibrant colors of the plant material to deliver the benchmark colors and flavors of restaurant products, and in some situations even exceed these. Pre-treating the plant material to deactivate enzymes, and in particular browning enzymes such as polyphenol oxidase, in a way that does not cause significant degradation of the organoleptic qualities of the plant material, prevents browning deterioration of the plant material within the product. A specific pre-treatment of the plant material in accordance with U.S. patent application Ser. No. 13/880,512 referenced above can be used or any other process that allows the plant pigments to be soluble in both the oil and water phases and provides preservation of the color and flavor of the plant material within both the water and oil phases. A pre-treatment that further reduces the moisture content of the plant material to less than 70% (e.g., 60%, 50%, 40%, 30%, etc.) may help stabilize (e.g., microbial stability, enzyme deactivation) the plant material when incorporated into the product. With careful formulation around the properties of the plant material to provide microbial stability without strong acidification, colors that are even more vibrant and flavors that are even stronger and more robust than restaurant benchmarks can be achieved due to the elimination of effects such as enzymatic browning, plant pigment degradation and acid discoloration, which lead to colors fading, for example, green color changing to khaki, and herb flavors diminishing as a result of natural plant senescence within hours or days of preparation. Additional ingredients may be used to maintain quality and ensure food safety. For example, conventional humectants, salts or other water activity controlling agents may be added in conventional amounts for microbial safety, or conventional antioxidants in conventional amounts may be added to extend shelf life. Another unexpected advantage is the small volume of plant material required. In some embodiments, typically as little as 5%, 4%, 3% or even 2% by weight of dried plant material will rehydrate providing density and texture in a way that could not be achieved using fresh or traditionally dried plant material, even combined with thickeners and stabilizers.

Retail sauces and flavoring products typically involve a combination of heat treatment and acidity to provide food safety and shelf life for retail distribution. These result in significant color and flavor degradation of the culinary plant constituents due to color and flavor instability. Emerging technologies such as high pressure processing, ultrasonics, etc. claim to achieve the microbial food safety without the detrimental impacts of heat, however, they still fail to protect and deliver the colors, flavors and textures as described herein for any length of time. The process described herein utilizes the novel plant material described above (U.S. patent application Ser. No. 13/880,512), which combine the superior flavors and colors with a robust stability against deterioration, allowing the products to meet the necessary minimum shelf life of a retail environment.

The formation of the emulsion is essential in dispersing the colors and flavors of the plant material throughout the product, as well as for manufacturing purposes. The emulsion-split utilizes freezing technology, but in a new and inventive way as described herein, to enable the product to be processed and prepared as a homogenous blend, but then allowing for separation of the high-clarity oil component for the end user. The ability to produce the product as a homogenous blend is critical for food manufacturing operations such as blending, pumping and filling into packages. Therefore, if the product contains two immiscible substances (such as oil plus water, or oil plus plant particulates), it is required to emulsify these into a homogenous blend. The formation of a homogenous blend for the current applications is also needed in order to allow the flavor and colors of the herbs within the water phase to impart into the oil phase. However, a homogenous blend does not deliver the aesthetic attributes required of the finished product due to the milky nature of this type of liquid. Therefore, it has been found that subjecting the product to sub-zero temperature to induce a state change in the water phase was able to split the emulsion. This provides the benefit of color and flavor within both immiscible phases which cannot be achieved via other methods such as dual-filling mechanisms.

As stated above, plant materials used as a base for the flavoring products include those products described in U.S. patent application Ser. No. 13/880,512 referenced above.

They include herbs, spices, vegetables, fruits and other edible plant materials having the ability to add color and/or flavor to culinary meals.

Prior to the development of plant materials referenced above, a successful product of the type referenced herein with the required attributes has not been attainable. Some products incorporate other forms of plant material, such as IQF (individually quick frozen) and dried. However, the quality achieved by these forms is variable and limited. For example, IQF herbs are not suitable due to active enzymes which induce deterioration. And some dried plant materials can lack the vibrant, fresh color and flavor characteristics of the plant material referenced herein, and therefore the resultant product is not of comparable quality to the restaurant benchmarks described herein.

Example

TABLE

| Component | % by weight |
|---|---|
| Basil treated in accordance with U.S. patent application Ser. No. 13/880,512, | 7 |
| Parsley treated in accordance with U.S. patent application Ser. No. 13/880,512, | 5 |
| Garlic | 3 |
| Vegetable Oil | 52.45 |
| Water | 23 |
| Salt | 3.5 |
| Sugar | 5 |
| Xanthan Gum | 0.05 |
| Sodium Ascorbate | 1 |

Process:
- A. Combine water, salt, sugar, xanthan gum and sodium ascorbate and blend until well combined (1-2 minutes).
- B. Under sheer slowly add the oil to the aqueous solution until homogenous.
- C. Add basil, parsley, garlic and blend to release color and flavor into the emulsion (60 seconds).
- D. Fill a squeezable sauce bottle, seal, and place in the freezer (−18° C.) until contents is frozen.
- E. Thaw and refrigerate the product. Once thawed product exists as oil and water phases. The product contains characteristic color and flavor components of the fresh plant material in both the high clarity oil and water phases.
- F. To use, shake then drizzle the liquid in a zig-zag pattern over the meal. The colored high clarity oil will begin to 'bleed' and separate from the water phase containing the plant material.
- G. A product produced as described under this method would be expected to last at least 8 weeks under refrigeration.

The ability to achieve quality herb products and sauces which retain the fresh vibrant colors and flavors of their restaurant benchmarks will create a new product quality standard within the retail and industrial environment. The ability to achieve this combination of high quality flavor plus true-to-form product application could pave the way to many new opportunities, in both food and non-food uses.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a food flavoring product comprising,
    adding a plant material to a water-oil carrier,
    forming a homogenous mixture of said plant material and the water-oil carrier,
    placing the homogeneous mixture into a package, and
    subjecting the package to freeze-thaw cycling to separate the water-oil carrier containing said plant material into separate water and oil containing components,
    resulting in a composition comprising a separate water phase containing said plant material with characterizing pigment color and flavor characteristics of the plant material, and a plant material colored oil and water phases when dispensed from the package.

2. The method of claim 1, wherein:
    the plant material contains browning enzymes, and
    the plant material is pre-treated to deactivate substantially all of the browning enzymes.

3. The method of claim 1, wherein:
    the plant material contains:
        enzymes that have been substantially deactivated, or
        plant pigments that remain both oil and water soluble even after enzyme deactivation; or
        a plant pigment comprising chlorophyll.

4. The method of claim 1, Wherein prior to adding the plant material to the water-oil carrier, the plant material is treated by:
    electromagnetic energy with wavelengths greater than 1 µm; or
    microwave energy.

5. The method of claim 1, wherein:
    the plant material has a moisture content of less than 70% prior to addition to the water-oil carrier; or
    the plant material comprises an aromatic plant material.

6. The method of claim 1, wherein the characterizing pigment color of the plant material is present in both the oil and the water phases of the food flavoring product.

7. The method of claim 1, wherein the plant material comprises apple, asparagus, aubergine, basil, bay leaf, beetroot, capsicum, berry fruits, carrot, coriander, shallots, chili, chili pepper, chives, chervil, dill, fennel, garlic, ginger, galangal, kale, leek, lemon, lemongrass, lime, melon, mint, marjoram, olive, onion, oregano, parsley, pear, pepper, rosemary, radish, sage, spring onion, spinach, stone fruits, sweet potato, thyme, tarragon, turmeric, watercress, and/or mixtures thereof.

8. The method of claim 1, wherein the plant material is present in the food flavoring product in an amount of at least 2% by weight.

9. The method of claim 1, wherein the oil comprises edible culinary oil and/or vegetable oil.

10. The method of claim 1, wherein the oil comprises canola oil, coconut oil, olive oil, peanut oil, rapeseed oil, rice bran oil, safflower oil, sesame oil, soybean oil, sunflower oil, and/or mixtures thereof.

11. The method of claim 1, wherein the oil is present in the food flavoring product in an amount of 20 to 70% by weight.

12. The method of claim 1, wherein:
    the freeze-thaw cycling comprises freezing the package at a temperature below 0° C. to obtain a frozen package and thawing the frozen package at a temperature above 0° C. for at least one freeze-thaw cycle; and the freeze-thaw cycling is performed before dispatching the food flavoring product to an end user.

13. The method of claim 1, wherein the food flavoring product additionally contains one or more selected from the group consisting of a starch, a gum, a thickener, a stabilizer, an emulsifier, a hydrocolloid, an antioxidant, a salt, a sugar, and a preserving agents.

14. The method of claim 1, wherein:

the food flavoring product does not support microbial growth at refrigerated conditions at less than 4° C., or the food flavoring product is modified using water activity and/or pH modifying agents.

15. The method of claim 1, wherein the food flavoring product is pourable from the package.

16. The method of claim 1, wherein the oil phase and the water phase of the composition are separated, and the oil phase is substantially clear.

17. The method of claim 1, wherein the characteristic color of the plant material within the oil phase appears florescent and pigmented with a color characteristic of the plant material.

18. The method of claim 1, wherein the food flavoring product further comprises a flavoring agent.

* * * * *